(12) United States Patent  
Gibby (10) Patent No.: US 9,163,523 B2  
(45) Date of Patent: Oct. 20, 2015

(54) TURBOCHARGER WITH FLEXIBLE INSTALLATION

(75) Inventor: Dale G. Gibby, Columbus, IN (US)

(73) Assignee: Cummins Inc., Columbus, IN (US)

( * ) Notice: Subject to any disclaimer, the term of this patent is extended or adjusted under 35 U.S.C. 154(b) by 201 days.

(21) Appl. No.: 13/531,860

(22) Filed: Jun. 25, 2012

(65) Prior Publication Data

US 2013/0340425 A1  Dec. 26, 2013

(51) Int. Cl.
  *F02B 33/44* (2006.01)
  *F01D 17/14* (2006.01)
  *F01D 25/24* (2006.01)
  *F02B 37/16* (2006.01)

(52) U.S. Cl.
  CPC ............... *F01D 17/14* (2013.01); *F01D 25/24* (2013.01); *F02B 37/16* (2013.01); *F05D 2220/40* (2013.01); *Y02T 10/144* (2013.01); *Y10T 29/49245* (2015.01)

(58) Field of Classification Search
  CPC ........ F02C 6/12; F02C 3/107; F05D 2220/40; F16C 2360/24; F02B 37/007; Y02T 10/144
  USPC ............... 60/605.1, 602; 415/182.1
  See application file for complete search history.

(56) References Cited

U.S. PATENT DOCUMENTS

| | | | | |
|---|---|---|---|---|
| 4,376,617 A | * | 3/1983 | Okano et al. | 417/407 |
| 4,414,839 A | * | 11/1983 | Dilley et al. | 73/23.4 |
| 5,199,260 A | * | 4/1993 | Iwick | 60/602 |
| 6,155,048 A | | 12/2000 | Vertanen | |
| 6,539,715 B2 | | 4/2003 | Julazadeh et al. | |
| 7,165,401 B2 | | 1/2007 | McEwen et al. | |
| 7,210,295 B2 | | 5/2007 | McEwen | |
| 8,172,500 B2 | * | 5/2012 | Fleig et al. | 415/55.3 |

* cited by examiner

*Primary Examiner* — Thomas Denion  
*Assistant Examiner* — Thomas Olszewski  
(74) *Attorney, Agent, or Firm* — Krieg DeVault LLP (57) ABSTRACT

One embodiment is an apparatus including a bearing housing mechanically coupled to a compressor housing on a first side and to a turbine housing on a second side. The compressor housing has a compressor outlet and the turbine housing has a fluid outlet. A first flow path fluidly connects the compressor outlet to a first circumferential channel formed between the bearing housing and the compressor housing. A fifth flow path fluidly connects the fluid outlet to a second circumferential channel formed between the bearing housing and the turbine housing. A third fluid flow path fluidly connects the first circumferential channel to the second circumferential channel. The apparatus further includes a fluid conduit that fluidly connects the fluid outlet to an actuator.

16 Claims, 7 Drawing Sheets

TURBOCHARGER WITH FLEXIBLE INSTALLATION

BACKGROUND

Many internal combustion engines include turbochargers that improve the power density of the engine. A large turbocharger improves power density but lowers engine response, while a small turbocharger improves engine response but can overspeed at maximum engine ratings. A wastegate is often installed to allow the use of a small turbocharger, and to bypass some of the exhaust flow at rated power to prevent overspeed.

Presently available wastegate turbochargers utilize a compressor-side pressure signal to indicate when the wastegate should be bypassing some of the exhaust flow. The compressor-side pressure signal is passed from the compressor side through a flexible tube to the actuator side where the wastegate is actuated. Each turbocharger orientation—i.e. the position of the compressor inlet relative to the turbine outlet, and the position of the compressor and turbine relative to the bearing housing—requires a tube of different length and routing, increasing installation variability and part number counts. Further, each potential installation configuration has a different vibration and heat transfer profile that must be tested or associated risks must be accepted. Flexible tubes around the turbocharger are also exposed to external contact and potential damage. In addition to wastegates, dump valves, bypass valves, and blowoff valves can have similar issues with multiple part numbers and pressure tube routing vulnerability. There is a need for the turbocharger with flexible installation disclosed herein.

SUMMARY

One embodiment is an apparatus including a bearing housing mechanically coupled to a compressor housing on a first side and to a turbine housing on a second side. The compressor housing has a compressor outlet and the turbine housing has a fluid outlet. A first flow path fluidly connects the compressor outlet to a first circumferential channel formed between the bearing housing and the compressor housing. A fifth flow path fluidly connects the fluid outlet to a second circumferential channel formed between the bearing housing and the turbine housing. A third fluid flow path fluidly connects the first circumferential channel to the second circumferential channel. The apparatus further includes a fluid conduit that fluidly connects the fluid outlet to an actuator. Further embodiments, forms, objects, features, advantages, aspects, and benefits shall become apparent from the following description and drawings.

DETAILED DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

Figure 1:
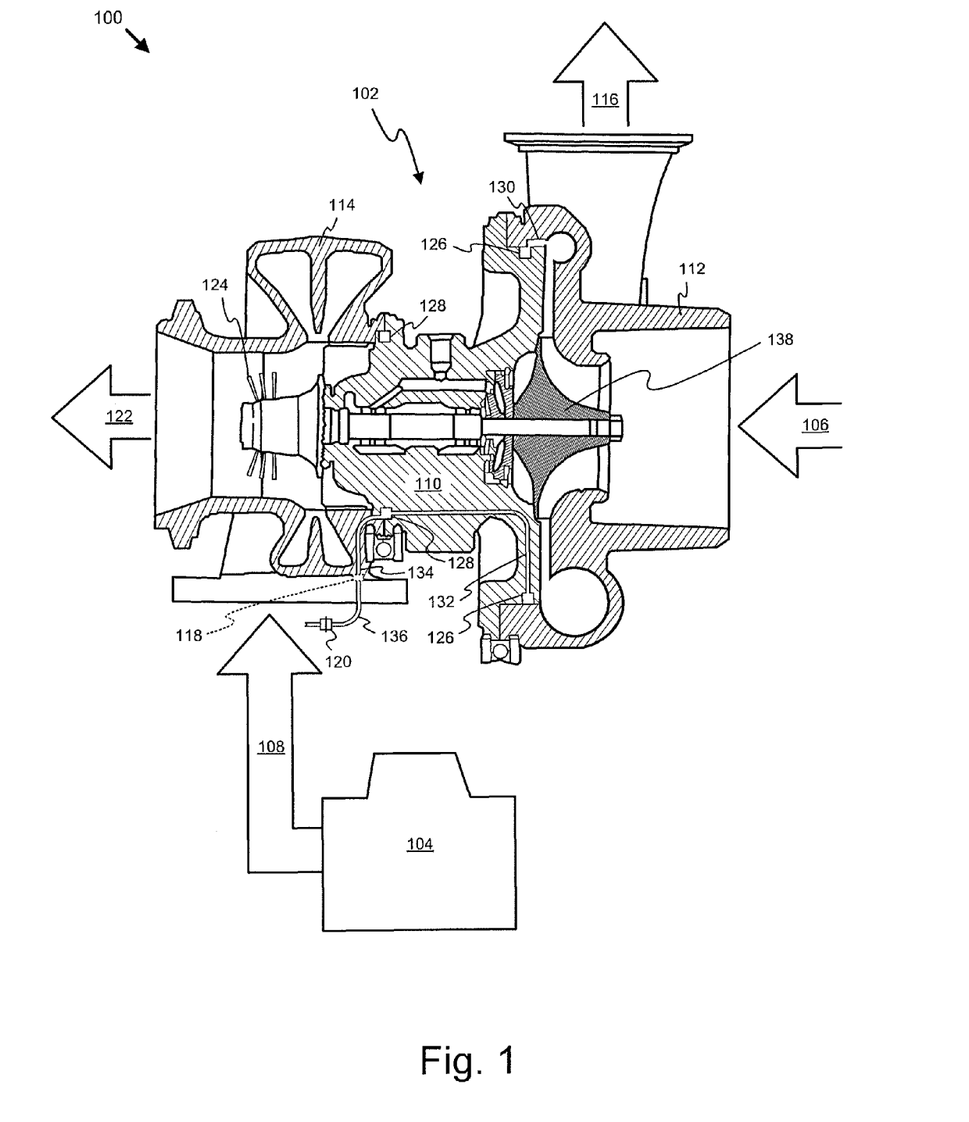
FIG. 1 is a schematic block diagram of one embodiment of a system for flexible installation of a turbocharger.

FIG. 1 is a schematic block diagram of one embodiment of a system 100 for flexible installation of a turbocharger 102. The system 100 includes an internal combustion engine 104 that receives an intake stream 106 and provides an exhaust stream 108. A bearing housing 110 is mechanically coupled to a compressor housing 112 on a first side, and to a turbine housing 114 on a second side. The compressor housing 112 has a compressor outlet 116 and receives the intake stream 106. It is understood that the compressor housing 112 may receive a stream from another compressor (not shown), for example in a two-stage turbocharger system, as the specific source of the intake stream 106 is not important to the present application. The turbine housing 114 has a fluid outlet 118 and receives the exhaust stream 108.

The fluid outlet 118 of the turbine housing 114 is a fluid outlet 118 providing pressure or mass flow to an actuator 120, not the exhaust outlet 122 of the turbine housing 114 where the exhaust stream 108 exits after providing work to the turbine wheel 124. The fluid outlet 118 may be an opening, a boss, a nipple, and/or any other type of feature known in the art to allow fluid passage from the turbine housing while allowing the connection of a fluid conduit 136 to conduct the fluid to the actuator 120. In one embodiment, the fluid outlet 118 may conduct fluid directly to the actuator 120, for example the fluid outlet 118 may be an outlet through a mounting bolt of the actuator 120 (refer to FIG. 5 and the related description).

The system 100 further includes a first circumferential channel 126 formed between the bearing housing 110 and the compressor housing 112, and a second circumferential channel 128 formed between the bearing housing 110 and the turbine housing 114. The channels 126, 128 are sized to provide sufficient pressure communication and fluid flow such that the fluid flowing through them can activate the actuator 120. The type and action of the actuator for a specific embodiment may determine such sizing, and it is a mechanical step for one of skill in the art to make a sizing determination based on the specific hardware for a given system 100. The first circumferential channel 126 may be formed as a groove in the bearing housing 110, in the compressor housing 112, or in both housings 110, 112. The groove(s) forms a channel defined by the surfaces of the bearing housing 110 and compressor housing 112. The groove(s) may be machined, cast, molded, or developed in the housings 110, 112 by any method understood in the art. Similarly, the second circumferential channel 128 may be formed as a groove in the bearing housing 110, in the turbine housing 114, or in both housings 110, 114.

The system 100 includes a first flow passage 130 fluidly connecting the compressor outlet 116 to the first circumferential channel 126. The first flow passage 130 may be a channel fluidly connecting a region with a pressure representative of the compressor outlet 116 pressure to the first circumferential channel 126. The first flow passage 130 may be drilled, otherwise machined, molded, cast, or otherwise formed by any method understood in the art. In one embodiment, the first flow passage 130 is a notch providing fluid communication between a segment of the compressor volute near the compressor outlet 116 and a section of the compressor housing 112 communicating with the first circumferential channel 126 when the compressor housing 112 is coupled to the bearing housing 110.

The system 100 further includes a fifth flow passage 132 fluidly connecting the first circumferential channel 126 to the second circumferential channel 128. The fifth flow passage 132 may be a channel within the bearing housing 110 wall, a molded channel on the surface of the bearing housing 110 (not shown) or other fluid communication component. The fifth flow passage 132 may be drilled, otherwise machined, molded, cast, or otherwise formed by any method understood in the art.

The system 100 further includes a third flow passage 134 fluidly connecting the second circumferential channel 128 to the fluid outlet 118. The third flow passage 134 may be a channel within the turbine housing 114 wall, a molded channel on the surface of the turbine housing 114 (not shown) or other fluid communication component. The third flow passage 134 may be drilled, otherwise machined, molded, cast, or otherwise formed by any method understood in the art.

The system 100 further includes a fluid conduit 136 fluidly connecting the fluid outlet 118 to an actuator 120, wherein the actuator 120 opens to relieve a pressure in response to one of a high compressor outlet pressure and a high turbocharger inlet pressure. For example, the actuator 120 may operate a wastegate or bypass valve that routes a portion of the exhaust stream 108 around the turbine wheel 124 when the actuator 120 is open. The fluid conduit 136 may comprise a rigid steel tube, a rubber hose, a molded flow passage, a direct outlet to the actuator 120 (for example through a mounting bolt of the actuator), and/or any other flow conduction apparatus understood in the art. The fluid conduit 136 may be external, for example as shown in FIG. 1, or internal, for example communicating fluid direction from the fluid outlet 118 to the actuator 120 with no hoses or tubing exposed.

In one embodiment, the system 100 allows the installation of a turbocharger 102 with an arbitrary bearing housing 110 position. Further, the compressor housing 112 and/or the turbine housing 114 angles may be adjusted within a range of angles. In one embodiment, the compressor housing 112 and turbine housing 114 are each adjustable to any angle. In an exemplary embodiment, the actuator 120 maintains a constant relative position to the fluid outlet 118 at any compressor housing 112 and/or turbine housing 114 orientation, allowing the installation of a turbocharger 102 configured in any orientation wherein the turbocharger 102 comprises a single hardware specification—e.g. a single part number.

In one embodiment, the first flow passage 130 fluidly connects a first pressure responsive region to a second flow passage, wherein the second flow passage is engageable over a range of rotation angles of a housing enclosing a bladed wheel. As used herein, engageable indicates that the fluid flow connection is maintained. For example, the second flow passage may be engageable over the range 0-30 degrees for the housing (as measured from an arbitrary "zero-degree" position), which indicates that the first flow passage 130 maintains fluid connectivity with the second flow passage between 0-30 degrees for the housing. The housing and bearing housing may include, in some embodiments, physical restraints to enforce rotation within the engageable angles, for example a stop peg (not shown). In one embodiment, the housing is a compressor housing 112, the bladed wheel is a compressor wheel 138, and the first pressure responsive region is a region of the turbocharger 102 having a pressure representative of the compressor outlet 116 pressure. For example, the first pressure responsive region may be a region in the compressor housing 112 volute near the outlet of the volute. In an alternate embodiment, the housing is a turbine housing 114, the bladed wheel is the turbine wheel 124, and a second pressure responsive region is an outlet port 118 on the turbine housing 114, where a fluid conduit 136 fluidly connects the outlet port 118 to an actuator 120.

The second flow passage may be a circumferential channel formed between the bearing housing 110 and the wheel housing. The wheel housing may be the turbine housing 114 or the compressor housing 112. The channel may be formed from: a groove in the bearing housing 110 mating with a face of the compressor housing 112 to form the second flow passage, a groove in the compressor housing 112 mating with a face of the bearing housing 110 to form the second flow passage, or a groove in the bearing housing 110 matching up with a groove in the compressor housing 112 to form the second flow passage. In alternate embodiments, the channel may be formed from: a groove in the bearing housing 110 mating with a face of the turbine housing 114 to form the second flow passage, a groove in the turbine housing 114 mating with a face of the bearing housing 110 to form the second flow passage, or a groove in the turbine housing 114 matching up with a groove in the compressor housing 112 to form the second flow passage.

In one embodiment, the bearing housing 110 is mechanically coupled to the compressor housing 112 on a first side and mechanically coupled to the turbine housing 114 on a second side. The third flow passage 134 fluidly connects a second pressure responsive region to a fourth flow passage defined by second circumferential channel 128, and the fourth flow passage is engageable over a range of rotation angles of the turbine housing 114. The bearing housing 110 includes a fifth flow passage 132 that fluidly connects the second flow passage defined by first circumferential channel 126 to the fourth flow passage defined by second circumferential channel 128. The second flow passage may be the first circumferential channel 126 formed between the bearing housing 110 and the compressor housing 112. The fourth flow passage may be the second circumferential channel 128 formed between the bearing housing 110 and the turbine housing 114. The first pressure responsive region comprises a region of the system 100 representative of the compressor outlet 116 pressure, and the second pressure responsive region includes an outlet port 118 on the turbine housing 114.

The circumferential channels 126, 128 may describe any range of angles, including up to 360 degrees of rotation. In one embodiment, the compressor housing 112 and/or the turbine housing 114 can be rotated through a range of angles, including up to 360 degrees rotation, while the fluid path from the compressor outlet 116 to the actuator 120 is maintained without any alteration of physical parts in the fluid path. Therefore, in one embodiment, the compressor housing 112 and turbine housing 114 are rotatable to any angle relative to the bearing housing 110 and the system 100 comprises a single part number, or a single hardware specification.

Figure 2:
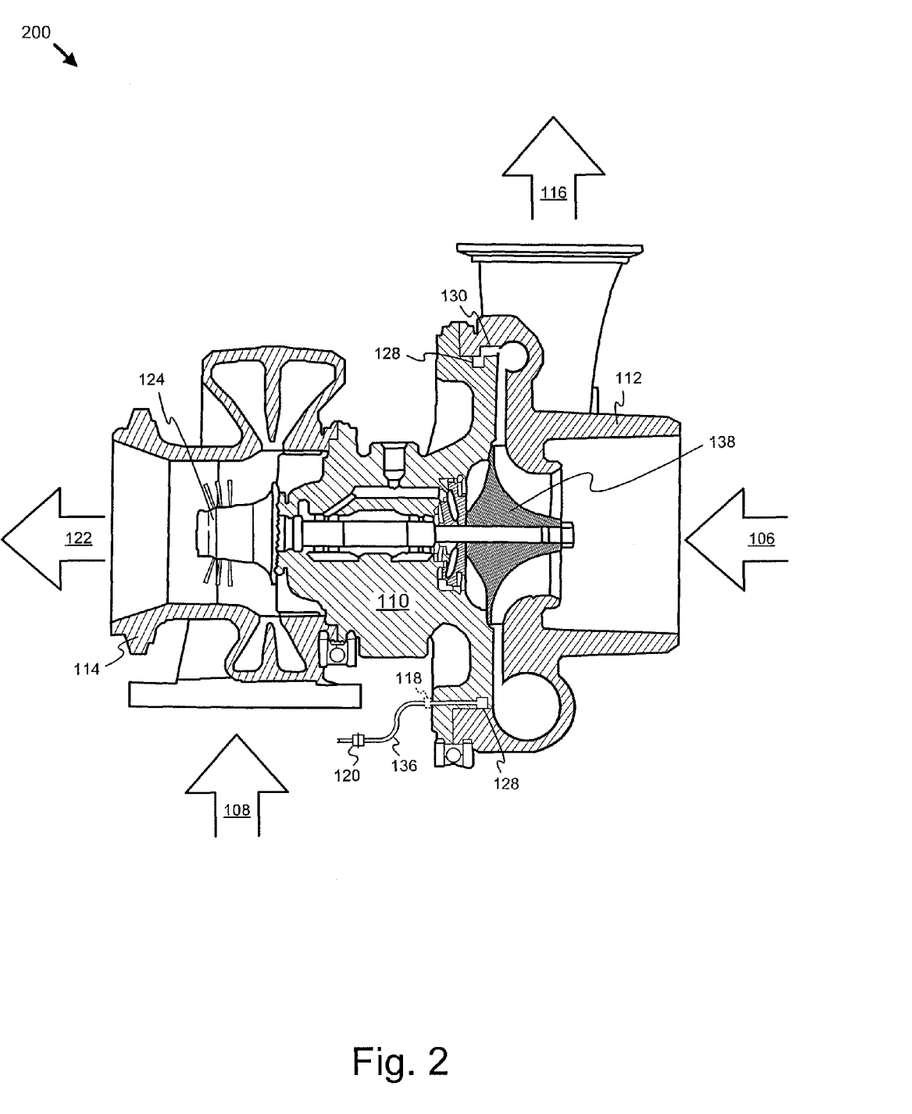
FIG. 2 is a schematic of one embodiment of an apparatus for flexible installation of a turbocharger.

FIG. 2 is a schematic of one embodiment of an apparatus 200 for flexible installation of a turbocharger 102. The apparatus 200 includes a compressor housing 112 enclosing a bladed wheel 138. The compressor housing 112 includes a first fluid passage 130 fluidly connecting a first pressure responsive region to a second flow passage 126. The second flow passage 126 is engageable over a range of rotation angles of the compressor housing 112. In the embodiment of FIG. 2, the first pressure responsive region is a compressor outlet 116. In the embodiment of FIG. 2, the compressor housing may be rotated to a range of angles relative to the bearing housing 110 without a change in the apparatus 200 hardware specification.

Figure 3A:
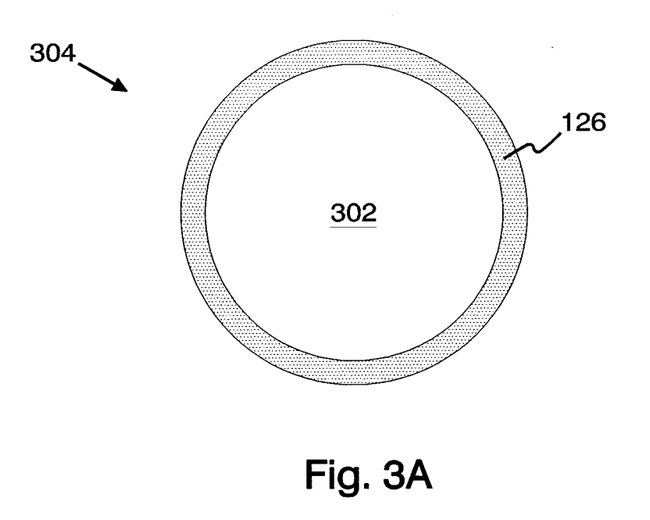
FIGS. 3A and 3B are schematic illustrations of a second flow passage engagable over a range of rotation angles of a compressor housing, and a fourth flow passage engagable at any rotation angle of a turbine housing.
Figure 3B:
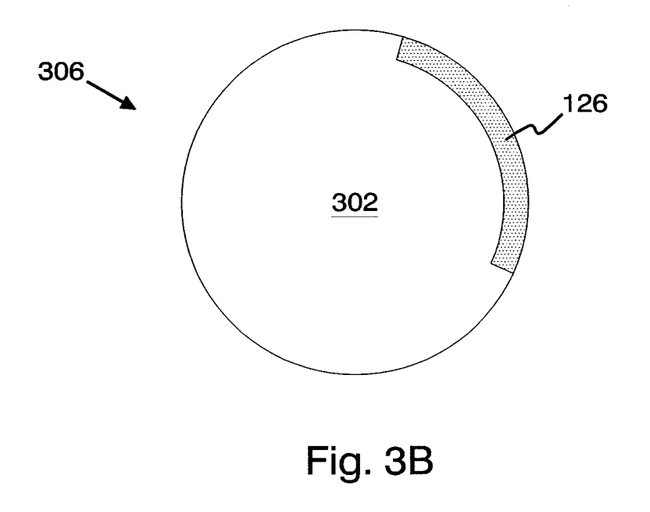

FIGS. 3A and 3B are schematic illustrations of flow passages engagable over a range of rotation angles of a compressor housing 112. It is understood that the illustrations of FIGS. 3A-3B could be flow passages engagable over a range of rotation angles of a turbine housing 114. FIGS. 3A-3B schematically illustrate a face of a bearing housing 110, disembodied from a turbocharger 102 for visualization, but that may be mechanically coupled to a compressor housing 112 or a turbine housing 114 during use. The illustration 304 in FIG. 3A shows a face 302 of a bearing housing 110 having a flow passage such as first circumferential channel 126 (or second circumferential channel 128) that is a groove describing a range of angles around the bearing housing 110. The flow passage allows the coupled compressor housing 112 to rotate through the range of angles while maintaining fluid communication between the first flow passage 130 and the second flow passage 132. Specifically, when the first flow passage 130 intersects the first circumferential channel 126, fluid communication occurs between the first flow passage 130 and the flow passage of first circumferential channel 126. Therefore, the illustration 304 shows an embodiment where the compressor housing 112 is rotatable through about 90 degrees.

The illustration 306 of FIG. 3B shows a face 302 of a bearing housing 110 having a flow passage defined by first circumferential channel 126 that is a groove describing a range of angles around the bearing housing 110. In the embodiment of the illustration 306, the first circumferential channel 126 describes a 360 degree range around the bearing housing 110 allowing the compressor housing 112 to rotate to any angle while maintaining fluid communication between the first flow passage 130 and the second flow passage 132.

Figure 4A:
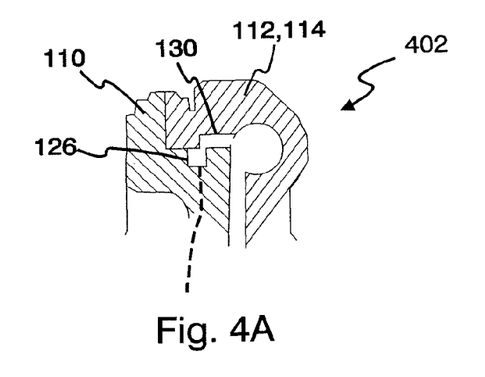
FIGS. 4A-4C are schematic illustrations depicting a circumferential channel as a groove in a surface of a bearing housing, a circumferential channel as a groove in a surface of a wheel housing, and a circumferential channel formed between a bearing housing and a wheel housing.
Figure 4B:
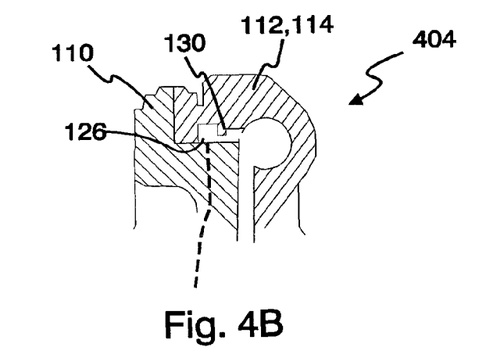
Figure 4C:
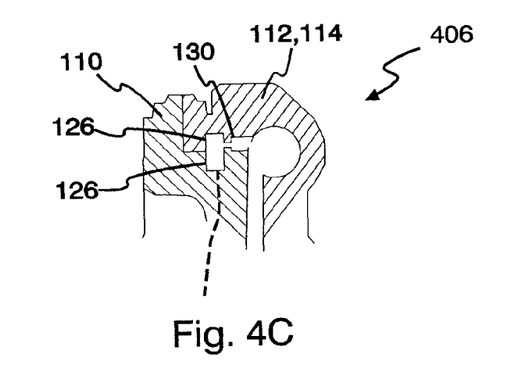

FIGS. 4A-4C are schematic illustrations depicting a circumferential channel 402 as a groove in a surface of a bearing housing 110, a circumferential channel 404 as a groove in a surface of a wheel housing 112, 114, and a circumferential channel 406 formed between a bearing housing 110 and a wheel housing 112, 114. The wheel housing 112, 114 may be a compressor housing 112 and/or a turbine housing 114. As FIGS. 4A-4C illustrate, the channel 402, 404, 406 may be a groove on the bearing housing 110, the wheel housing 112, 114, or both housings 110 & 112, 114.

Figure 5:
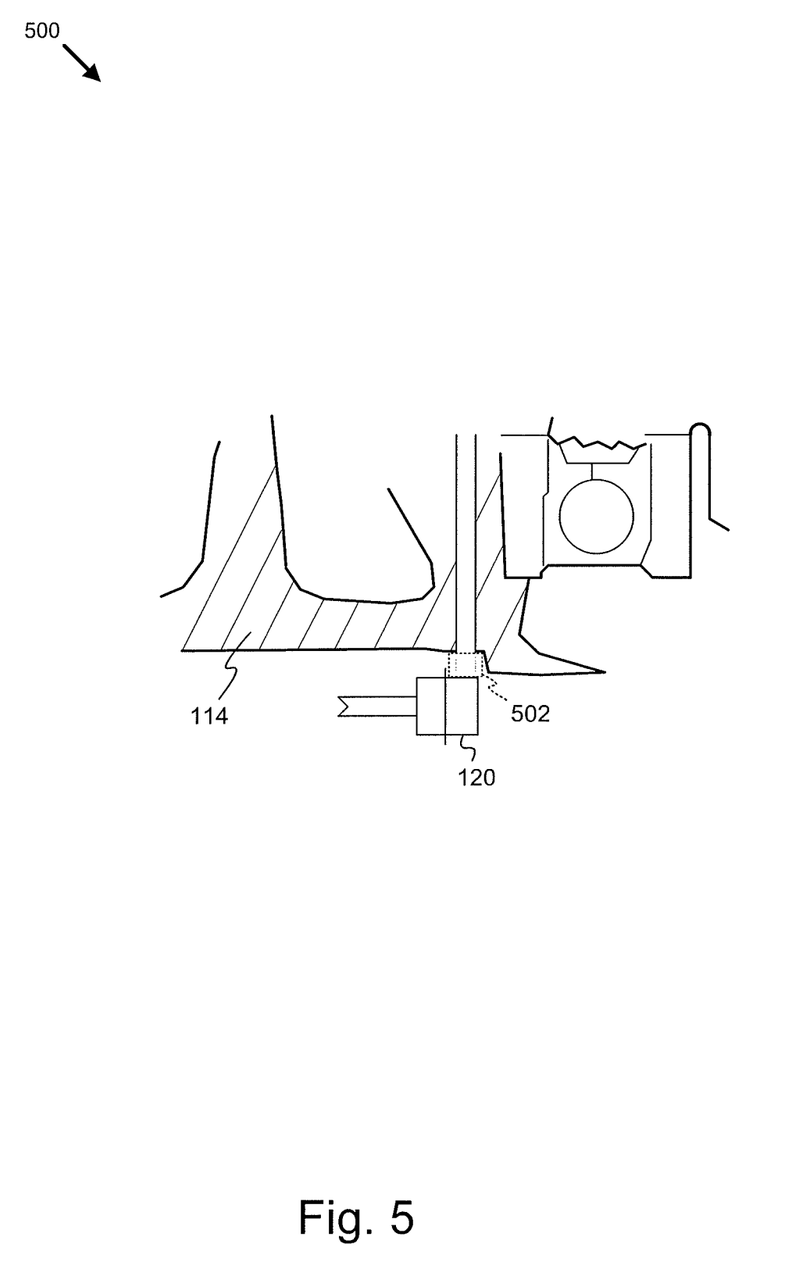
FIG. 5 is a schematic illustration depicting a fluid connection through a mounting bolt of an actuator.

FIG. 5 is a schematic illustration depicting a fluid connection through a mounting bolt 502 of an actuator 120. In one embodiment, the actuator 120 is mounted on the turbine housing 114 or the compressor housing 112. For example, a blowby valve (vents excess compressor pressure around to compressor inlet) or a dump valve (vents excess compressor pressure to the atmosphere) may be mounted on the compressor housing 112. A wastegate or a bypass valve may be mounted on the turbine housing 114. Various actuators 120 utilizing compressor outlet and/or turbine inlet pressure are known and contemplated within the present application. In one embodiment, the fluid conduit 136 is not an external member, but rather is an internal passage 502 such as a fluid connection through a mounting bolt 502 of the actuator 120.

Figure 6:
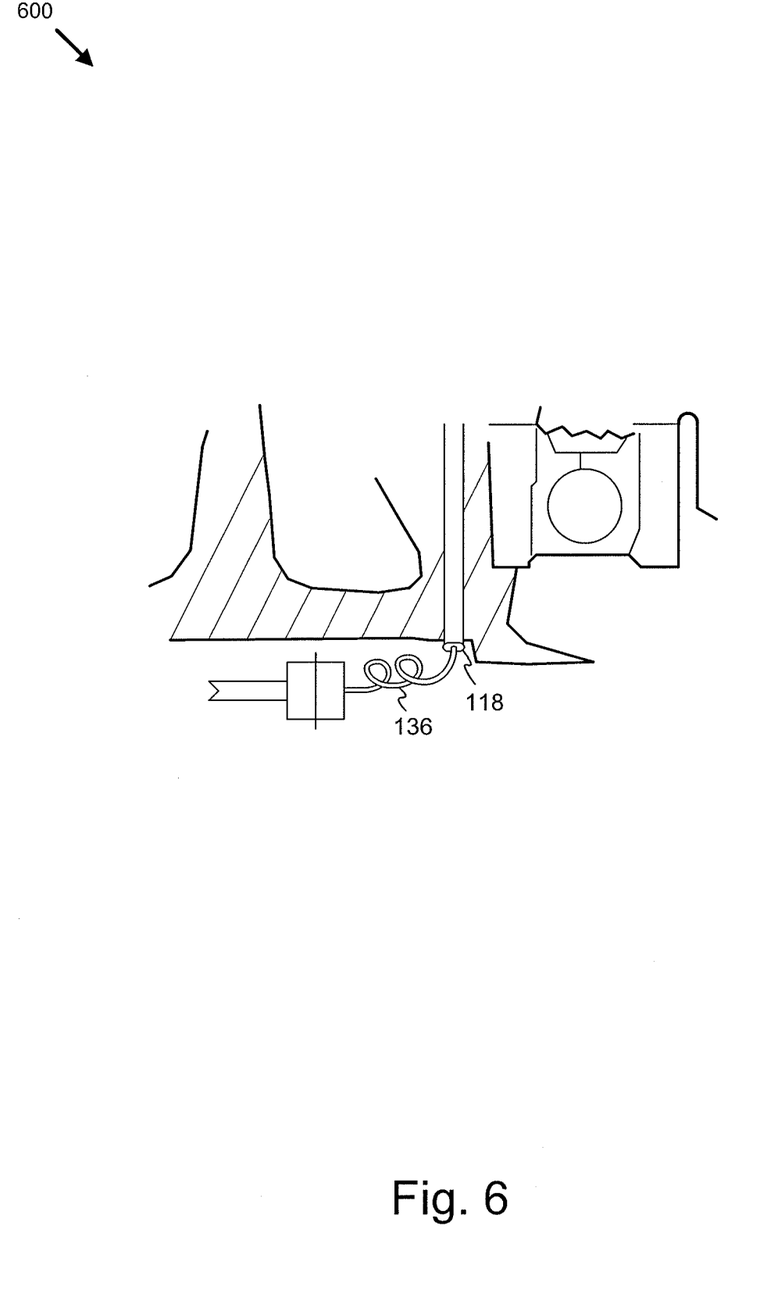
FIG. 6 is a schematic illustration depicting a fluid conduit with a specified effective heat transfer area.

FIG. 6 is a schematic illustration depicting a fluid conduit 136 with a specified effective heat transfer area. In some embodiments, the fluid communicating from the compressor outlet 116 to the actuator 120 is at a high temperature, and can further pick up heat energy from the turbine housing 114 or other system components. Many actuators 120 have temperature limits that may be exceeded in some embodiments at some operating conditions of a turbocharger 102. In one embodiment, the fluid conduit 136 includes a specified effective heat transfer area to dissipate heat from the communicating fluid. The specified heat transfer area may be selected, in one embodiment, such that the fluid temperature at the actuator 120 is about equal to the fluid temperature at the compressor outlet 116, although other temperature target selections are possible.

It is a mechanical step for one of skill in the art, based on the disclosures herein, to select a specified effective heat transfer area such that a temperature target is achieved based on the actuator 120 limits, the expected compressor outlet 116 temperature, the heat transfer environment around the fluid conduit 136, heat inputs from the compressor housing 112, bearing housing 110, and/or turbine housing 114, and the like. The specified effective heat transfer area may be achieved through helical windings of the fluid conduit 136 as illustrated in FIG. 6, although other arrangements as understood by one of skill in the art are contemplated. For example and without limitation, the fluid conduit 136 may comprise a cross-sectional shape providing heat transfer surface, a routing profile providing heat transfer surface, and/or fins providing heat transfer surface. In one embodiment, the specified effective heat transfer area may be achieved through the use of insulation where the heat transfer environment of the fluid conduit 136 may otherwise provide excessive heat transfer.

Figure 7:
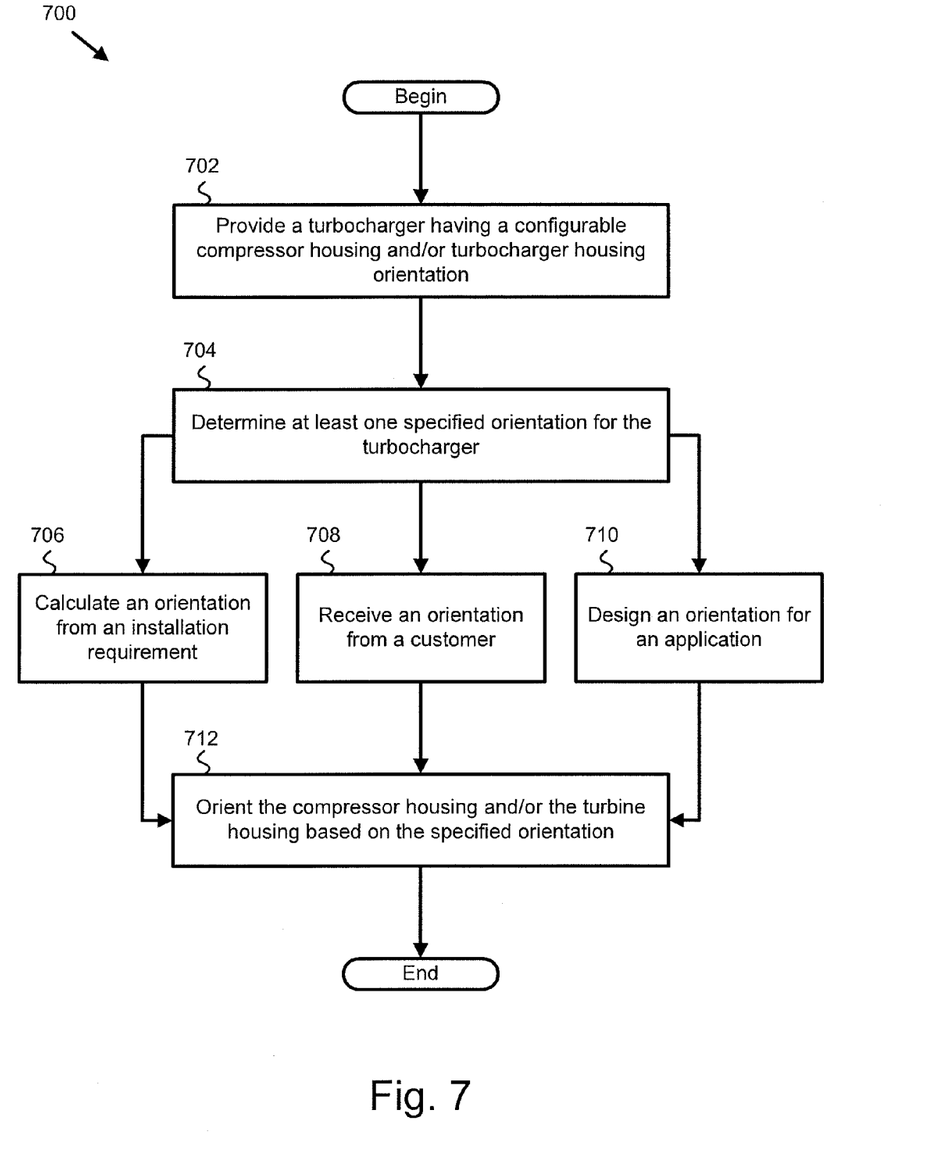
FIG. 7 is a schematic flow chart diagram of a method for flexibly installing a turbocharger.

FIG. 7 is a schematic flow chart diagram of a method 700 for flexibly installing a turbocharger. The method 700 includes providing 702 a turbocharger 102 having a configurable compressor housing 112 and/or turbine housing 114 orientation. For example, a turbocharger 102 of some embodiments of the turbocharger 102 illustrated in FIG. 1 may be provided. The compressor housing 112 and turbine housing 114 orientations comprise an angle of the compressor housing 112 and/or turbine housing 114 relative to the bearing housing 110, relative to an external feature of the turbocharger 102, and/or angles measured in some absolute fashion. For example, a turbocharger 102 having an arbitrary compressor housing 112 orientation has a different compressor housing 112 orientation if the compressor housing 112 is rotated through a measurable angle while the bearing housing 110 and turbine housing 114 are stationary.

The method 700 further includes determining 704 at least one specified orientation for the turbocharger 102. The specified orientation includes a bearing housing 110 orientation, a compressor housing 112 orientation, and/or a turbine housing 114 orientation. Determining 704 the specified orientation includes, without limitation, calculating 706 an orientation from an installation requirement, receiving 708 an orientation from a customer, designing 710 an orientation for an application, and the like. The method includes orienting 712 the compressor housing 112 and/or the turbine housing 114 based on the specified orientation.

As is evident from the figures and text presented above, a variety of embodiments according to the present invention are contemplated. Certain exemplary embodiments include an apparatus having a housing enclosing a bladed wheel, wherein the housing includes a first flow passage. The first flow passage fluidly connects a first pressure responsive region to a second flow passage, where the second flow passage is engagable over a range of rotation angles of the housing. In further embodiments, the housing is a compressor housing, and the first pressure responsive region is a region having a pressure representative of the compressor outlet pressure. In certain alternate embodiments, the housing is a turbine housing, and the first pressure responsive region comprises an outlet port on the turbine housing. The apparatus further includes a fluid conduit fluidly connecting the outlet port to an actuator.

In certain further embodiments, the apparatus includes a bearing housing mechanically coupled to the housing, and the second flow passage is a circumferential channel formed between the bearing housing and the housing. The circumferential channel may be a groove in a surface of the bearing housing or the housing. In certain embodiments, the second flow passage is engageable at any rotational angle of the housing, and the circumferential channel describes 360 degrees of rotation around the bearing housing and/or housing.

Certain further embodiments include an apparatus having a bearing housing mechanically coupled to the compressor housing on a first side and mechanically coupled to a turbine housing on a second side. The turbine housing may have a third flow passage where the third flow passage fluidly connects a second pressure responsive region to a fourth flow passage. In certain embodiments, the fourth flow passage is engagable over a range of rotation angles of the turbine housing, and the bearing housing includes a fifth flow passage that fluidly connects the second flow passage to the fourth flow passage.

In certain further embodiments, the second flow passage is a circumferential channel formed between the bearing housing and the compressor housing, and the fourth flow passage is a circumferential channel formed between the bearing housing and the turbine housing. In one embodiment, the range of rotation angles of the compressor housing may be any rotation angle, and the circumferential channel formed between the bearing housing and the compressor housing describes 360 degrees of rotation. In one embodiment, the range of rotation angles of the turbine housing may be any rotation angle, and the circumferential channel formed between the bearing housing and the turbine housing describes 360 degrees of rotation. In one further embodiment, the apparatus comprises a single part number.

In certain embodiments, the second pressure responsive region includes an outlet port on the turbine housing, and the apparatus further includes a fluid conduit fluidly connecting the outlet port to an actuator. The actuator may be a wastegate actuator or a bypass valve. The fluid conduit may be a rigid metal tube, a hose, and/or a fluid connection through a mounting bolt of the actuator. In a further embodiment, the fluid conduit may be a rigid metal tube having a specified effective heat transfer area.

Certain exemplary embodiments include an apparatus having a bearing housing mechanically coupled to a compressor housing on a first side, and mechanically coupled to a turbine housing on a second side. The compressor housing includes a compressor outlet and the turbine housing includes a fluid outlet. In a further embodiment, the apparatus includes a first circumferential channel formed between the bearing housing and the compressor housing, and a second circumferential channel formed between the bearing housing and the turbine housing. The apparatus further includes a first flow passage fluidly connecting the compressor outlet to the first circumferential channel, a third flow passage fluidly connecting the first circumferential channel to the second circumferential channel, and a fifth flow passage fluidly connecting the second circumferential channel to the fluid outlet. The apparatus further includes a fluid conduit that fluidly connects the fluid outlet to an actuator.

In a further embodiment, the actuator is configured to open and relieve a pressure in response to a high compressor outlet pressure or a high turbocharger inlet pressure. The first circumferential channel may be a cast channel in the bearing housing, a machined channel in the bearing housing, a cast channel in the compressor housing, a machined channel in the compressor housing and/or a channel formed from the bearing housing mated to the compressor housing. The second circumferential channel may be a cast channel in the bearing housing, a machined channel in the bearing housing, a cast channel in the turbine housing, a machined channel in the turbine housing and a channel formed from the bearing housing mated to the turbine housing.

Certain exemplary embodiments include a system with an internal combustion engine receiving an intake stream and providing an exhaust stream. The system includes a bearing housing mechanically coupled to a compressor housing on a first side, and mechanically coupled to a turbine housing on a second side. The compressor housing includes a compressor outlet and receives the intake stream, and the turbine housing includes a fluid outlet and receives the exhaust stream. In one embodiment, a first circumferential channel is formed between the bearing housing and the compressor housing, and a second circumferential channel is formed between the bearing housing and the turbine housing. In a further embodiment, a first flow passage fluidly connects the compressor outlet to the first circumferential channel, a fifth flow passage fluidly connects the first circumferential channel to the second circumferential channel, and a third flow passage fluidly connects the second circumferential channel to the fluid outlet. The system includes a fluid conduit fluidly connecting the fluid outlet to an actuator. The actuator is configured to open and relieve a pressure in response to a high compressor outlet pressure or a high turbocharger inlet pressure.

Certain exemplary embodiments include a method that includes providing a turbocharger comprising a housing enclosing a bladed wheel. The housing has a first flow passage, where the first flow passage fluidly connects a first pressure responsive region to a second flow passage. The second flow passage is engagable over a range of rotation angles of the housing. The housing may be a compressor housing or a turbocharger housing. The method further includes determining at least one specified orientation for the turbocharger, and orienting the housing based on the at least one specified orientation. In certain further embodiments, the method includes orienting both the compressor housing and the turbine housing based on the at least one specified orientation. The turbocharger may be a turbocharger according to an exemplary apparatus embodiment of the present application.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a compressor housing enclosing a bladed wheel, the compressor housing comprising a first flow passage, wherein the first flow passage is a notch in the compressor housing that fluidly connects a volute of the compressor adjacent a first pressure responsive region to a second flow passage, wherein the first pressure responsive region includes a compressor outlet pressure, and wherein the second flow passage is engagable over a range of rotation angles of the compressor housing;
a turbine housing including an outlet port on the turbine housing and a fluid conduit fluidly connecting the outlet port to an actuator, the turbine housing further including a third flow passage;
a bearing housing mechanically coupled to the compressor housing on a first side of the bearing housing and mechanically coupled to the turbine housing on a second side of the bearing housing, wherein the second flow passage is formed between the compressor housing and the bearing housing, wherein the third flow passage is a channel within the turbine housing that fluidly connects the outlet port to a fourth flow passage between the turbine housing and the bearing housing, wherein the fourth flow passage is engagable over a range of rotation angles of the turbine housing; and
wherein the bearing housing further comprises a fifth flow passage that fluidly connects the second flow passage to the fourth flow passage.

2. An apparatus according to claim 1, wherein the second flow passage comprises a circumferential channel formed between the bearing housing and the compressor housing and the fourth flow passage comprises a circumferential channel formed between the bearing housing and the turbine housing.

3. An apparatus according to claim 2, wherein the circumferential channel of the second flow passage comprises a groove in a surface of one of the bearing housing and the compressor housing and the circumferential channel of the fourth flow passage comprises a groove in a surface of one of the bearing housing and the turbine housing.

4. An apparatus according to claim 2, wherein the range of rotation angles comprises any rotation angle, and wherein the circumferential channel describes 360 degrees of rotation.

5. An apparatus according to claim 1, wherein the actuator comprises a wastegate actuator.

6. An apparatus according to claim 1, wherein the fluid conduit comprises a rigid metal tube.

7. An apparatus according to claim 1, wherein the fluid conduit comprises a rigid metal tube having a specified effective heat transfer area.

8. An apparatus according to claim 1, wherein the actuator comprises a bypass valve.

9. An apparatus according to claim 1, wherein the fluid conduit comprises a fluid connection through a mounting bolt of the actuator.

10. An apparatus comprising:
a bearing housing mechanically coupled to a compressor housing on a first side, and mechanically coupled to a turbine housing on a second side;
wherein the compressor housing comprises a compressor outlet and wherein the turbine housing comprises a fluid outlet;
a first circumferential channel formed between the bearing housing and the compressor housing, and a second circumferential channel formed between the bearing housing and the turbine housing;
a first flow passage defined by a notch in the compressor housing fluidly connecting the compressor outlet to the first circumferential channel, a third flow passage defined by a channel in the turbine housing fluidly connecting the second circumferential channel to the fluid outlet of the turbine housing, and a fifth flow passage in the bearing housing fluidly connecting the first circumferential channel and the second circumferential channel; and
a fluid conduit that fluidly connects the fluid outlet to an actuator.

11. An apparatus according to claim 10 wherein the actuator is configured to open and relieve a pressure in response to one of a high compressor outlet pressure and a high turbocharger inlet pressure.

12. An apparatus according to claim 10 wherein the first circumferential channel comprises a channel selected from the group consisting of a cast channel in the bearing housing, a machined channel in the bearing housing, a cast channel in the compressor housing, a machined channel in the compressor housing and a channel formed from the bearing housing mated to the compressor housing.

13. An apparatus according to claim 10 wherein the second circumferential channel comprises a channel selected from the group consisting of a cast channel in the bearing housing, a machined channel in the bearing housing, a cast channel in the turbine housing, a machined channel in the turbine housing and a channel formed from the bearing housing mated to the turbine housing.

14. A system comprising:
an internal combustion engine receiving an intake stream and providing an exhaust stream;
a bearing housing mechanically coupled to a compressor housing on a first side, and mechanically coupled to a turbine housing on a second side;
wherein the compressor housing comprises a compressor outlet and receives the intake stream, and wherein the turbine housing comprises a fluid outlet and receives the exhaust stream;
a first circumferential channel formed between the bearing housing and the compressor housing, and a second circumferential channel formed between the bearing housing and the turbine housing;
a first flow passage defined by a notch in the compressor housing fluidly connecting the compressor outlet to the first circumferential channel, a fifth flow passage fluidly connecting the first circumferential channel to the second circumferential channel, and a third flow passage defined by a channel in the turbine housing fluidly connecting the second circumferential channel to the fluid outlet; and
a fluid conduit fluidly connecting the fluid outlet to an actuator, wherein the actuator is configured to open and relieve a pressure in response to one of a high compressor outlet pressure and a high turbocharger inlet pressure.

15. A method comprising:
providing a turbocharger comprising a compressor housing enclosing a bladed wheel and a turbine housing, the compressor housing comprising a first flow passage defined by a notch in the compressor housing, wherein the first flow passage fluidly connects a first pressure responsive region to a second flow passage defined between the compressor housing and a bearing housing, and wherein the first pressure responsive region comprises a pressure representative of the compressor outlet pressure and the second flow passage is engagable over a range of rotation angles of the compressor housing, wherein the bearing housing is mechanically coupled to the compressor housing on a first side and mechanically coupled to the turbine housing on a second side, and wherein the bearing housing further comprises a fourth flow passage defined between the bearing housing and the turbine housing, the fourth flow passage engagable over a range of rotation angles of the turbine housing and the bearing housing defines a fifth flow passage fluidly connecting the second flow passage to the fourth flow passage, wherein the turbine housing comprises a third flow passage defined by a channel in the turbine housing fluidly connecting an outlet port of the turbine housing to the fourth flow passage;

determining at least one specified orientation for the turbocharger, wherein the at least one specified orientation comprises a bearing housing orientation, a compressor housing orientation, and a turbine housing orientation; and orienting the compressor housing and the turbine housing based on the at least one specified orientation.

16. An apparatus comprising:
a compressor housing enclosing a bladed wheel and a bearing housing mounted to the compressor housing;
a flow passage that communicates a pressure between a first pressure responsive region of the housing and a fluid outlet over a range of rotation angles of the housing, wherein the first pressure responsive region comprises a compressor outlet, and the fluid outlet is defined by a turbine housing; and
wherein the flow passage is defined by a notch in the compressor housing that fluidly connects the pressure responsive region to a circumferential channel defined between the housing and the bearing housing, wherein a channel in the turbine housing fluidly connects the fluid outlet to a second circumferential channel defined between the bearing housing and the turbine housing, and wherein a fifth flow passage in the bearing housing fluidly connects the first circumferential channel to the second circumferential channel.

* * * * *